United States Patent

Vawter et al.

[11] 3,729,809
[45] May 1, 1973

[54] NUT PLATE RIVETING DEVICE

[75] Inventors: Verne E. Vawter, Bonita; Richard E. Fernandez, San Diego, both of Calif.

[73] Assignee: Rohr Industries, Inc., Chula Vista, Calif.

[22] Filed: Nov. 22, 1971

[21] Appl. No.: 200,953

[52] U.S. Cl. ............... 29/243.53, 29/208 F, 29/464, 227/62
[51] Int. Cl. ............................................. B23p 11/00
[58] Field of Search ..................... 29/208 F, 243.53, 29/464, 243.54; 227/71, 67, 62

[56] References Cited

UNITED STATES PATENTS

| | | | |
|---|---|---|---|
| 2,069,042 | 1/1937 | Marchant | 227/62 |
| 3,646,660 | 3/1972 | Sheffer | 29/243.53 |

Primary Examiner—Charles W. Lanham
Assistant Examiner—J. W. Davie
Attorney—George E. Pearson

[57] ABSTRACT

For use with a rivet setting machine of the type having a single working axis, and which first drills a hole for a rivet on the working axis, and then replaces the drill on the working axis with a rivet inserting and squeezing mechanism, a nut plate having a threaded, screw receiving hole, and two rivet receiving holes is clamped to a workpiece with a pre-drilled hole in the work piece in register with the threaded hole in the nut plate. Two spring biased indexing pins enter, respectively, the two rivet holes in the nut plate to thereby index first rivet hole of the nut plate in the working axis of the rivet setting machine. The rivet setting machine is then actuated in a usual manner to drill a rivet hole in the work piece in register with the first hole in the nut plate and to then insert and squeeze a first rivet therein. The mechanism of the present invention then moves the assembly of nut plate, work piece and indexing pins laterally to index the second indexing pin and rivet hole in the nut plate on said working axis. Thereupon the rivet setting machine drills a second rivet hole in the work piece in register with the second rivet hole in the nut plate, and inserts and squeezes the second rivet to complete the nut plate attaching operation. The rivet setting machine and the mechanism of the present invention then return to starting position ready to repeat the operation. Means are provided on the mechanism of the present invention to measure and adjust the lateral movement of the mechanism of the present invention between the first and second drilling and rivet setting operations to conform to the spacing between rivet holes in a nut plate to be attached.

15 Claims, 11 Drawing Figures

Patented May 1, 1973

INVENTOR.
VERNE E. VAWTER
RICHARD E. FERNANDEZ

BY George E. Pearson

ATTORNEY

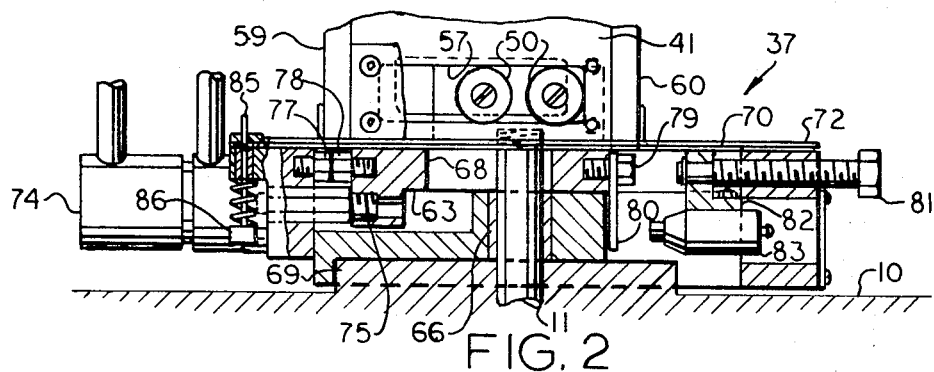
FIG. 2
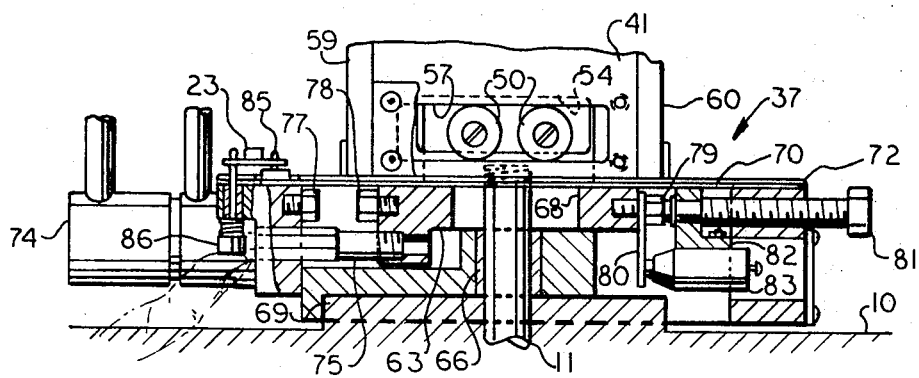
FIG. 3
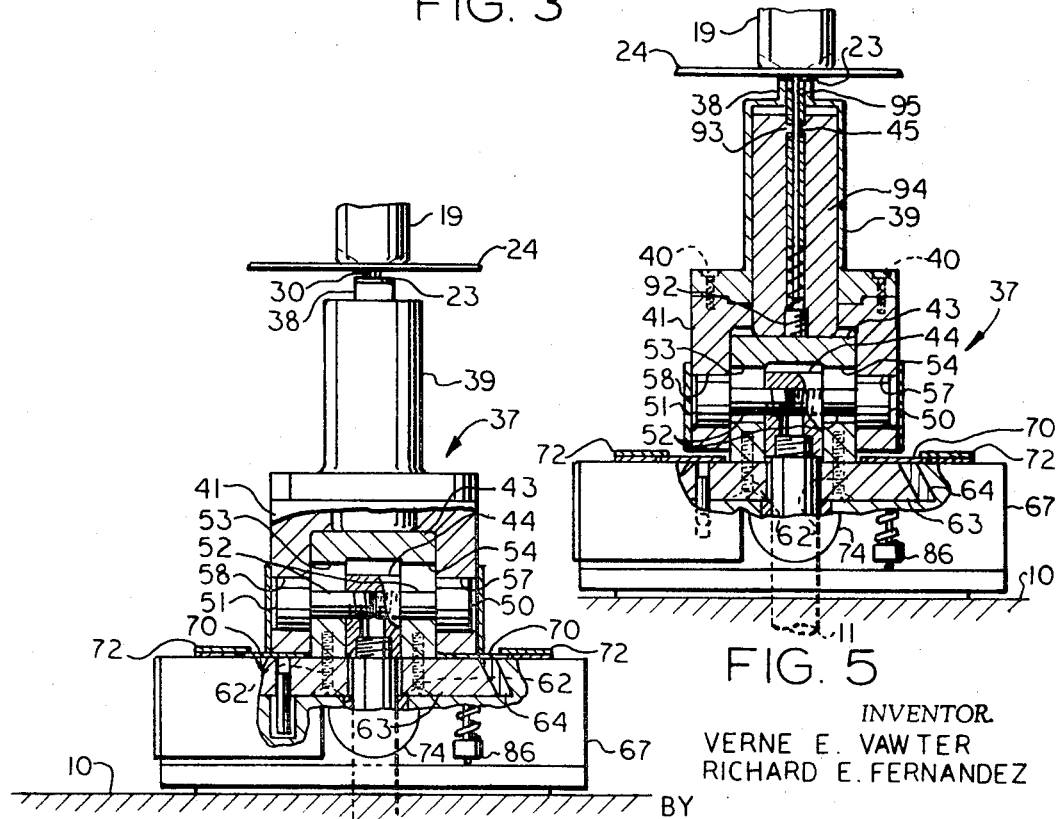
FIG. 4
FIG. 5
INVENTOR.
VERNE E. VAWTER
RICHARD E. FERNANDEZ
BY George E. Pearson
ATTORNEY INVENTOR.
VERNE E. VAWTER
RICHARD E. FERNANDEZ
BY George E. Pearson
ATTORNEY

INVENTOR.
VERNE E. VAWTER
RICHARD E. FERNANDEZ

BY George E. Pearson
ATTORNEY

NUT PLATE RIVETING DEVICE

BACKGROUND OF THE INVENTION

The present invention is related in subject matter to the co-pending application of Gerrett W. Gregory for Nutplate Riveting Device and Method, Ser. No. 47,541 filed June 18, 1970 and that of Donald S. Gross, for Nutplate Riveting Device and Method, Ser. No. 60,247, filed Aug. 3, 1970.

In mounting a nut plate on a work piece by means of an automatic rivet setting machine, it is customary to pre-drill or punch a hole in the work piece on centers where nut plates are to be installed. These holes are of a diameter slightly greater than that of the machine screws which are to be screwed into the nut plates when in use. A presser foot on such rivet setting machine has a rounded, work piece positioning lug of a diameter to pass through a selected one of the pre-drilled holes in the work piece and thence into the threaded opening in a nut plate to center the threaded hole in the nut plate in the pre-drilled hole. In the mechanism disclosed in the above identified Gregory application, as the presser foot clamps the nut plate to the workpiece, a spring pressed indexing pin enters one of the rivet holes in the nut plate to thereby index such rivet hole in the nut plate coaxially with the working axis of the rivet setting machine. The rivet hole is then drilled in the work piece, the drill is replaced on the working axis by the rivet inserting fingers, and the rivet is inserted and squeezed.

PURPOSE OF THE INVENTION

The present invention has for its primary objective to provide mechanism for attaching a nut plate having at least two rivet holes therein to a work piece. The nut plate is clamped in indexed position to the work piece with the axis of the threaded screw hole in the nut plate in register with a pre-drilled hole in the work piece, and with the axis of a first of two rivet holes in the nut plate in alignment with the working axis of a rivet setting machine, such as one marketed by General Electro Mechanical Corp. under the trademark DRIVMATIC. This working axis is occupied in recurring cycles, first by a drill for drilling a rivet hole in the work piece, and then by rivet inserting and squeezing mechanism. The clamping and indexing mechanism remains in its initial indexed position while the drill is actuated to drill a rivet hole in the work piece in register with such first nut plate rivet hole, and then is replaced on the working axis by the rivet inserting and squeezing mechanism which inserts the first rivet in the drilled hole and the first rivet hole in the nut plate, and then squeezes the rivet.

The clamping and indexing mechanism then moves, together with the work piece and the nut plate clamped and initially riveted together in indexed position, to align the axis of the second rivet hole in the nut plate with the working axis of the rivet setting machine. The second rivet hole is then drilled in the work piece and the second rivet inserted and squeezed to complete the fastening of the nut plate to the work piece, which is then released by the clamping and indexing mechanism and the parts of the rivet setting machine and the mechanism of the present invention return to their starting positions, ready to begin another nut plate attaching operation.

A further objective of the invention is to provide means for measuring and accurately adjusting movement of the clamping and indexing mechanism of the present invention between two selected, accurately adjusted positions.

BRIEF DESCRIPTION OF THE DRAWINGS

The foregoing objectives and advantages of the invention will be apparent from the following description and the accompanying drawings, wherein:

FIG. 2 is a fragmentary, vertical, longitudinal, sectional view of the lower portion of the mechanism shown in FIG. 1 with the lower slide assembly in its lefthand, starting position, a roller cover plate being broken away.

FIG. 3 is a sectional view similar to FIG. 2 showing the lower slide assembly moved to its right hand limit of movement, an operator's finger being shown in broken lines operating the spring pressed plunger.

FIG. 4 is a fragmentary, left hand end elevational view of the mechanism shown in FIG. 1, the upper portion of the presser foot assembly being broken away, the rollers and anvil of the rivet setting machine being shown in their lowered, parts releasing positions.

FIG. 5 is a view similar to FIG. 4 with the rollers elevated to nut plate clamping position.

DETAILED DESCRIPTION OF THE INVENTION

Figure 1:
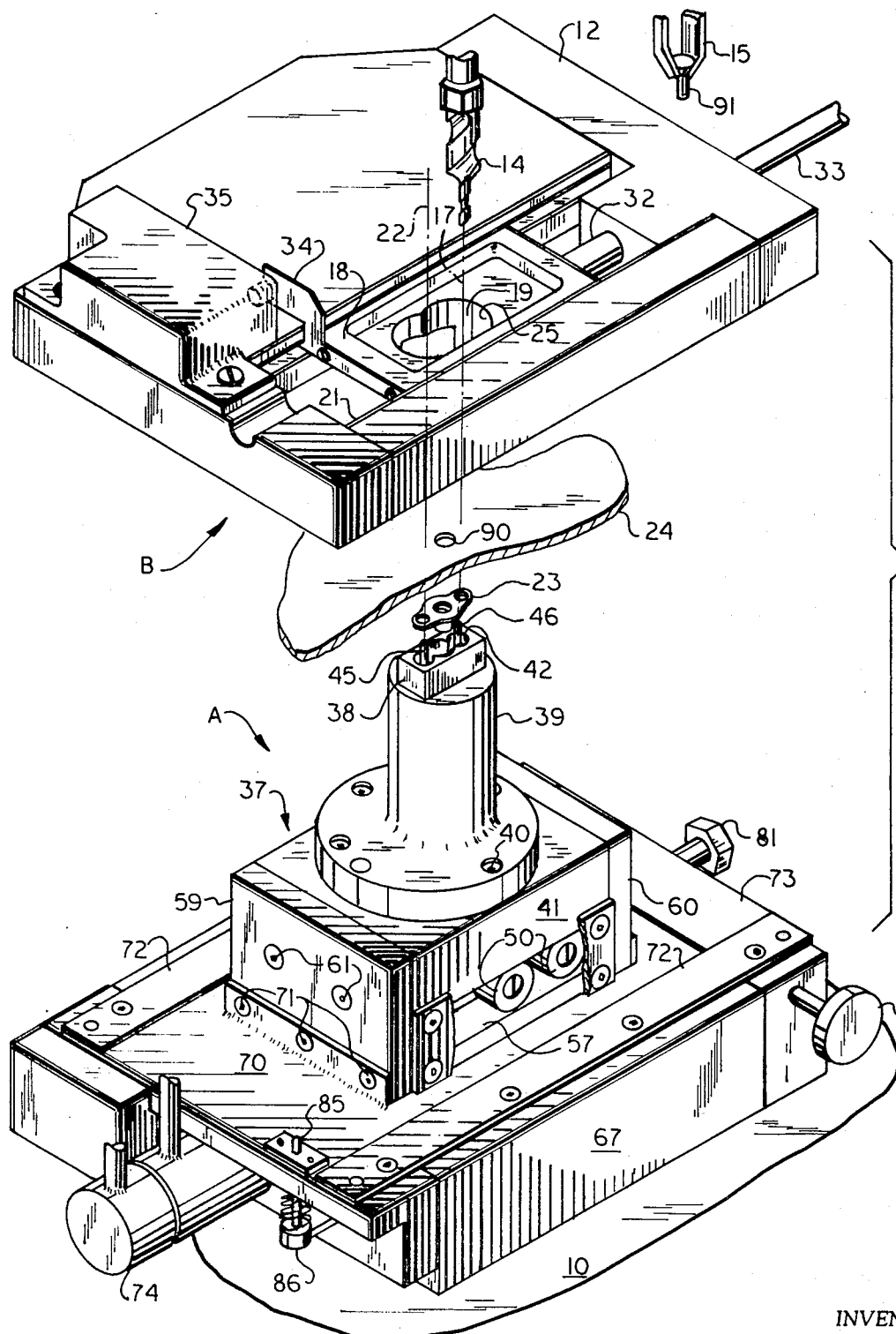
FIG. 1 is a fragmentary, exploded, perspective view of a mechanism embodying the present invention mounted on an existing rivet setting machine, such as a DRIVMATIC.

Referring to the drawings in detail, a nut plate clamping and indexing mechanism A embodying the present invention is shown mounted on a rivet setting machine B of known type, such as one marketed by General Electro Mechanical Corp. under the trademark DRIVMATIC. Since such machines are well known, only the portions thereof are shown which relate directly to the mounting and use of the present invention. These portions comprise the usual anvil 10 for squeezing a rivet at a programmed point in the sequence of operations of the rivet setting machine, and the thrust rod 11 for clamping a work piece and a part to be attached thereto in indexed position for riveting. A head portion 12 also is provided on the machine B and a drill 14, and a rivet inserting and back-up mechanism 15 are mounted for alternate movement, back and forth, in recurring cycles, into and out of alignment with the working axis 17 of the rivet setting machine B in the usual manner for such machines.

Figures 7, 8:
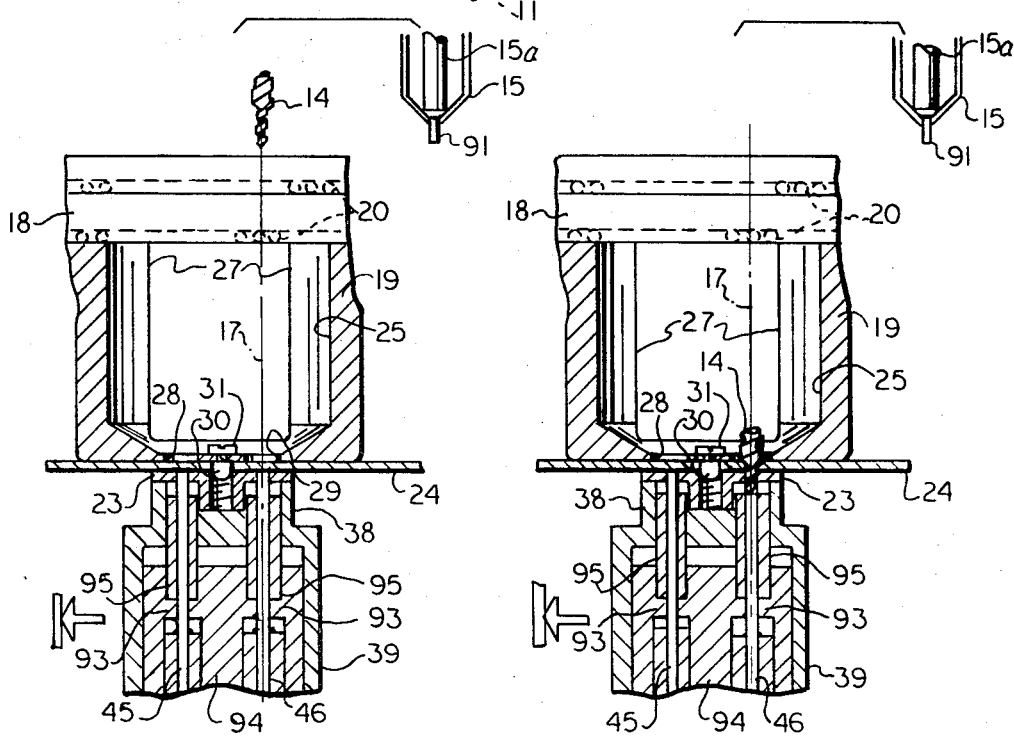
FIGS. 7 – 10 are somewhat diagrammatic, sectional views taken along a plane containing the axes of both spring pressed indexing and rivet squeezing pins, and show successive steps in the drilling of a rivet hole and the inserting and setting of a rivet therein with the first of the two rivet holes in a nut plate centered on the working axis of the rivet setting machine.

In accordance with the present invention a presser foot slide 18, with a stirrup shaped depending portion 19, is mounted in slide roller bearings 20, see FIGS. 7 and 8, in an opening 21 provided in the riveting machine head 12. The presser foot slide 18 is bored from its top, as shown in FIG. 1, slightly less than all the way through the depending portion 19 on two parallel axes 22 and 17, see FIG. 1, of which 17, as shown in FIG. 1, is the working axis of the rivet setting machine B. The axes 17 and 22 are spaced apart in the direction of presser foot slide movement by the center-to-center distance between the rivet holes in a nut plate 23 to be attached to a work piece 24. The effective diameter of the boring tool used for this boring operation is greater than the separation between the boring axes 17 and 22, and also is greater than the width of the depending portion 19, so that the bored holes overlap to form a single hole 25, and the side walls of the depending portion 19 are cut away at 27, see FIGS. 1 and 7 – 11. Holes 28 and 29, see FIG. 7, are drilled through the bottom of the depending portion 19 on the boring axes 17 and 22, see FIG. 1, wherein the presser foot slide 18 is in its left hand limit of movement. A round nosed indexing lug 30 of usual type, see FIGS. 7 – 10, is secured by a screw 31 to the bottom of the depending presser foot portion 19 midway between the holes 29 and 30.

A dowel-like piston 32, see FIG. 1, for moving the presser foot slide 18 to its left hand limit of movement at the beginning of each nut plate attaching operation, is mounted for axial movement in a hole drilled in the head 12, and a compressed air line 33, controlled by suitable valve mechanism, not shown, opens into this hole. An arm 34 secured to the presser foot slide 18 is positioned to actuate a switch 35 when the presser foot slide is in its left hand starting position. The switch 35 is connected into the usual actuating and control circuit of the rivet setting machine B in a manner which will be obvious to those familiar with such machines and prevents lowering of the drill 14 at the beginning of each nut plate attaching cycle of operation unless the presser foot slide 18 is in its left hand, starting position. The piston 32 is air actuated only at the beginning of each nut plate attaching operation, since after lock-up of the presser foot slide 18 with a lower slide assembly 37, to be described later herein, the movement of the presser foot slide is controlled by movement of the lower slide assembly.

Figure 6:
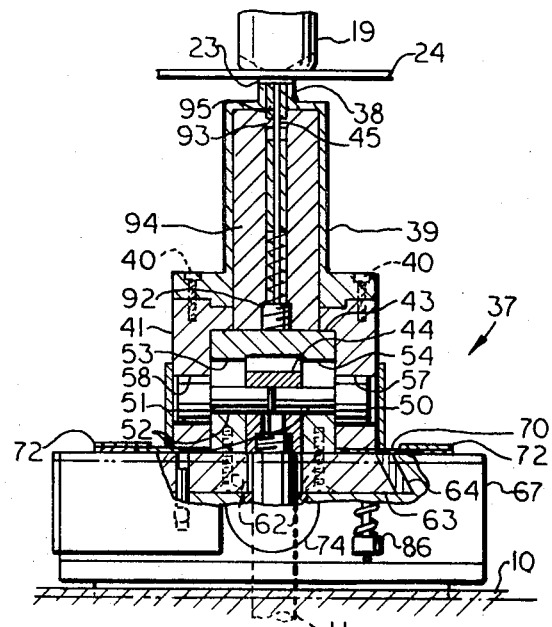
FIG. 6 is a view similar to FIG. 5 with the anvil also elevated to rivet squeezing position.

The lower slide assembly 37 comprises a nut plate support block 38 mounted on the upper end of an inverted cup shape housing 39, which is secured by screws 40, see FIGS. 1, 5 and 6, to the top of an outer, inverted, U shape block 41. A nut plate receiving hole 42, see FIG. 1, is bored in the nut plate support block 38 by three overlapping boring operations on centers corresponding, respectively, to the axes of the usual two rivet holes and the threaded hole in a nut plate 23 to be mounted in the hole.

The outer bored portions of the hole 42 in the nut plate support block 38, as best shown in FIGS. 5 – 11, have a pair of upwardly spring pressed indexing and rivet setting pins 45 and 46 mounted coaxially one in each thereof, which pins are parallel, and of a diameter, and spaced apart to fit slidably, in indexing position, into the rivet holes in a nut plate 23 mounted in the hole 42, while the central bored portion of the nut plate receiving hole 42 is of a size to receive the threaded portion of such nut plate freely therein.

The outer, inverted U shape block 41 is fitted slidably over an inner, inverted U shape block 43, see FIGS. 4 – 6, the inner U shape block in turn being fitted slidably over a roller mounting block 44 screwed in adjusted position onto the upper end of the thrust rod 11 of the rivet setting machine A.

Pairs of rollers 50 and 51, which may be conventional ball bearings, are journaled one on each of four roller support pins 52 pressed into opposite ends of two threaded holes provided in the roller mounting block 44. The pins 52 have free clearance in oblong holes 53 and 54 provided one in each side of the inner inverted U shape block 43, and the rollers 50 and 51 are, respectively, in rolling engagement with the upper sides of two similar oblong holes 57 and 58 provided one in each side of the outer U shape block 41.

The inner "U" shape block 43 is a few thousandths, for example, 0.005 inches, longer than the outer U shape block 41, and a pair of end retaining plates 59 and 60, secured by screws 61 one on each end of the inner U shape block 43, move the U shape blocks 41 and 43 lengthwise in unison, and at the same time permit the relative vertical movement of the outer inverted U shape block 41 required to clamp the work piece and nut plate together in indexed position.

The inner inverted U shape block 43 is secured by screws 62, see FIGS. 4 – 6, to a slide plate 63 mounted between bearing strips 64 in an undercut groove in a base block 67 for slidable movement parallel to the presser foot slide 18. The slide plate 63 has an oblong hole 68 therein to permit slidable movement of the lower slide assembly 37 relative to the base block and the thrust rod 11 slidably mounted for axial movement in a bearing 66, see FIGS. 2 and 3, in the base block. The base block 67 has a rectangular recess, see FIGS. 2 and 3, in the bottom thereof, which recess fits onto a projection 69 on the anvil 10.

A closure plate 70 for closing off the space between the lower slide assembly 37 and the base block 67 is secured to the end plates 59 and 60 by screws 71, see FIG. 1, with the side edges of the closure plate slidable within channeled side strips 72, and its right hand end fitted slidably beneath a transverse shield 73 secured to the base block.

For slidably moving the lower slide assembly 37 and the presser foot slide 18 in unison when the two are locked up as shown in FIG. 5, and to be described later herein, a two-way air cylinder 74 is mounted on an end of the base block 67, and the piston, not shown, of this air cylinder is connected to the lower slide plate 63 by a piston rod 75, see FIGS. 2 and 3.

A fixed limit stop for the left hand end of the slide plate 65 comprises the hardened head of a first screw 77, see FIGS. 2 and 3, screwed into a hole provided in the base block 67, and the similarly hardened head of a second screw 78 screwed into a hole provided in the left hand end of the slide plate 63 coaxially with the first screw. These screws are permanently adjusted, as by grinding, to position the lower slide assembly 37, when in its left hand limit of movement shown in FIGS. 1 and 2, with the axis of the right hand indexing and setting pin 46 coincident with the working axis 17 of the riveting setting machine B as shown in FIGS. 7 – 10.

For adjustably limiting sliding movement of the lower slide assembly 37 in a right hand direction so as to align the axis of the second indexing and setting pin 45 with the working axis 17 for drilling the hole and setting the second rivet, a hardened screw 79 is screwed into a hole in the right hand end of the slide plate 63, and also passes through a hole in, and grips beneath its head, a switch actuating plate 80. An axially adjustable screw 81 is screwed into a threaded hole provided in the right hand end of the base block 67 coaxially with the screw 79, and an unthreaded portion of the shank of the screw 81 is journaled in a bearing hole provided therefor in a switch support block 82 having a conventional limit switch 83 mounted thereon. The switch support block 82 is mounted for guided, slidable movement in a recess provided therefor in the base block 67. A thumb screw 84, see FIG. 1, having a nylon tip for pressure, locking engagement with the adjustable limit stop screw 81, is screwed into a threaded hole in the side of the base block 67 to axially intersect the screw 81 and lock the latter in adjusted position.

For setting the travel of the lower slide assembly 37 for a specific nut plate to be attached by the mechanism A, a fixed pin 85, see FIGS. 1, 2 and 3 of a size to fit into a first rivet hole in such nut plate, is fixedly mounted on the slide closure plate 70 to lie co-axially above a downwardly spring biased plunger 86 when the lower slide assembly 37 is in its left hand, starting position as shown in FIGS. 1 and 7. The upper end of the plunger 86 is of a size to fit into the other rivet hole of such nut plate. By moving the slide assembly 37 to its right hand limit of movement, i.e., the point at which the assembly is arrested by engagement of the screw 79 with the adjustable stop screw 81, and the limit switch 83 is operatively engaged by the plate 80 and adjusting such limit stop position by means of the adjusting screw 81 so that the rivet holes of a selected nut plate 23 receive, respectively, the fixed pin 85 and the plunger 86 with the latter raised to operative position as shown in FIG. 3, the lower slide mechanism is in properly adjusted position for attaching such nut plates to a workpiece in accordance with the present invention.

OPERATION OF THE ILLUSTRATED EMBODIMENT

The illustrative mechanism A embodying the present invention is operated, either manually, or by programmed or other control mechanism of any suitable or well known type, in conjunction with the rivet setting machine B upon which it is mounted, as follows:

For attaching a selected nut plate 23 to a work piece 24 in accordance with the invention, with the riveting machine B in starting, open condition a nut plate 23 is dropped into the hole 42 in the support block 38, the spring pressed indexing pins 45 and 46 for entering the rivet holes in the nut plate to index it for attachment. The work piece 24 is positioned on the nut plate 23 with a selected, pre-drilled hole 90, see FIG. 1, in the work piece in substantial register with the threaded hole in the nut plate. The presser foot slide 18 and the lower slide assembly 37 at this initial stage of operation are moved by their respective air cylinder piston rods 32 and 75 to their left hand limits of movement with the lug 30 substantially aligned with the threaded hole in the nut plate as shown in FIG. 1. The parts are then clamped together in such position by an upward movement of the thrust rod 11, which raises the nut plate support block 38 from its parts releasing position of FIG. 4 to its nut block and work piece clamping position of FIG. 5 via the roller mounting block 44, the two pairs of rollers 50 and 51, the outer inverted U shape block 41, and the inverted cup shape housing 39 having the nut plate support block 38 mounted thereon. In thus clamping the parts together, the lug 30 passes through the hole 90 in the work piece and into the threaded hole in the nut plate to axially align these two holes.

Figure 9:
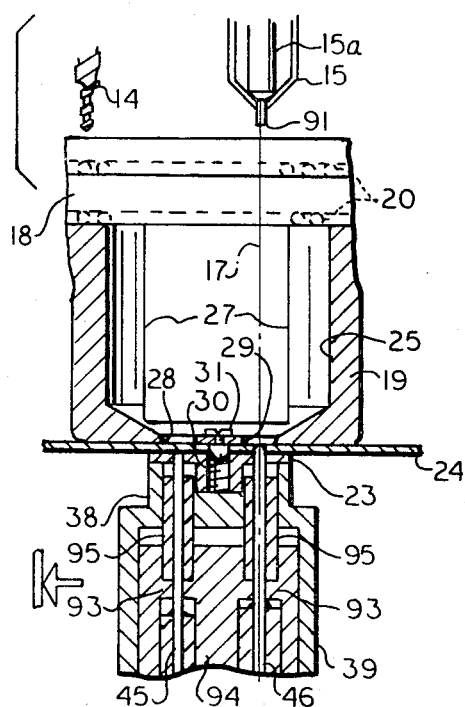
Figure 10:
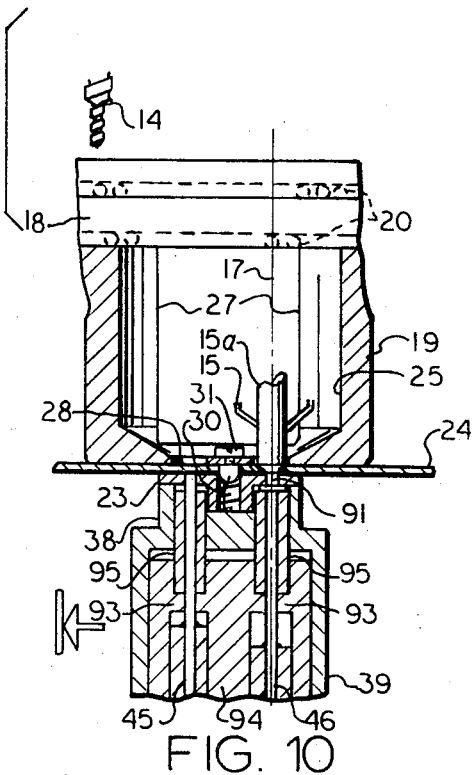

The rotating drill 14, centered on the working axis 17, is then lowered by the conventional operation of the rivet setting machine B from its starting position of FIG. 7 to its position of FIG. 8 to drill the hole for a first rivet, pressing the right hand spring pressed indexing pin 46 downwardly as required. The drill 14 is then withdrawn, and is moved laterally out of the way to the left as shown in FIG. 9, being replaced on the working axis 17 by the rivet inserting and back-up mechanism 15 with a rivet 91 gripped therein. The rivet is fed to the mechanism 15 during the drilling operation, either manually or by suitable feed means, not shown, and not a part of the present invention. The mechanism 15 then lowers the rivet in a usual manner into the first hole thus drilled in the work piece 24 and, as shown in FIG. 10, the usual back-up pin 15a of the mechanism 15 is lowered to back up the rivet from above. The anvil 10 of the rivet setting machine is then raised in usual manner, and, via the inner, inverted U shape block 43, see FIG. 6, a threaded plug 92 which is adjusted to support the lower end of the first indexing and rivet squeezing pin 46 and the shoulder 93 of a central cylinder plug 94 slidably mounted in the housing 39, which shoulder supports an upper short sleeve 95, raises the upper end of the pin 46 and the upper end of the sleeve 95, now flush therewith, into squeezing, heading engagement with the projecting lower end of the first rivet 91 in a well known manner for rivet setting machines of the type mentioned previously herein.

Figure 11:
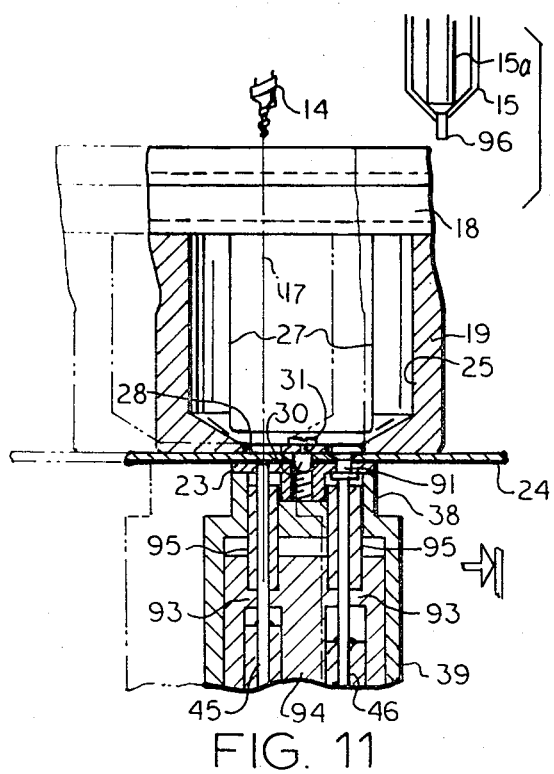
FIG. 11 is a sectional view generally similar to FIG. 7, but showing the slide mechanism moved to the right to center the second, or left hand rivet hole in the nut plate on the working axis of the rivet setting machine.

The anvil 10 is then lowered to its normal position, the rivet inserting and back-up mechanism 15 is raised and replaced on the working axis 17 by the drill 14, and simultaneously therewith the air cylinder 74 is actuated to move the lower slide assembly 37, and with it the presser foot slide 18 locked thereto, and the parts gripped therebetween, to their adjusted right hand limit of movement shown in FIGS. 3 and 11. This action, as explained previously herein, aligns the second indexing and rivet squeezing pin 45 and the second rivet hole in the nut plate 23 with the working axis 17, whereupon the drill 14 and rivet inserting and back-up mechanism 12 repeat their previously described cycle of operations as illustrated in FIGS. 6 – 10 to drill a second hole in the work piece and insert and squeeze a second rivet 96, see FIG. 11, in the second rivet hole of the nut plate, thereby completing the attachment of the nut plate 23.

Upon completion of the setting of the second rivet 96, the anvil 10 and thrust rod 11 are lowered to release the work piece 24 and its attached nut plate 23, the air cylinders are actuated to return the lower slide assembly 37 and the presser foot slide 18 to their left hand starting positions, and the drill 14 and rivet inserting and back-up mechanism 15 are returned to their right hand starting positions, whereupon the rivet setting machine B and attached mechanism A are ready to repeat the foregoing procedure as required for attaching other nut plates to the same or other work pieces in the manner described herein.

The invention provides a simple, strong and inexpensive mechanism which can readily be mounted upon a conventional rivet setter of the type specified, and after adjustment as described previously herein, will automatically attach nut plates rapidly and accurately as required.

Having thus described my invention, what I claim as new and useful and desire to protect by U. S. letters patent is:

1. In combination with a rivet setting machine having an anvil, a head, and a drill and combined rivet holder and back-up member moving in alternate cycles successively into and out of coincidence with a working axis, nut plate attaching means comprising,
   a presser foot mounted on the head,
   nut plate support mechanism mounted on the anvil for clamping between the support mechanism and the presser foot a work piece having a hole therein and a nut plate having a threaded, screw receiving hole and two axially parallel rivet receiving holes therein,
   means aligning such hole in the work piece with the threaded hole in such nut plate,
   indexing means positioning such nut plate with its rivet hole axes parallel to, and defining a plane containing, the working axis, and
   means moving the presser foot and the support mechanism with the work piece and nut plate clamped in indexed position therebetween, reciprocally between two limit stops along a path extending transversely of the work axis and parallel to such plane, the limit stops being arranged to position such nut plate at each end of such path with the axis of one of its rivet holes coincident with the working axis during a complete cycle of operation of the rivet setting machine to drill a hole in the work piece coaxially with each of such rivet holes in such nut plate and to insert and squeeze a rivet in each hole thus drilled and the rivet hole in such nut plate aligned therewith, thereby completing the attachment of such nut plate to such work piece.

2. Nut plate attaching means as claimed in claim 1 wherein the presser foot is slidably mounted on friction reducing slide bearings on the head of the rivet setting machine.

3. Nut plate attaching means as claimed in claim 1 wherein means are provided on the head for independently returning the presser foot to an initial position upon completing the attachment of each nut plate to a work piece.

4. Nut plate attaching means as claimed in claim 2 wherein the means for independently returning the presser foot to initial position comprises an air actuated cylinder operatively connected between the presser foot and the head.

5. Nut plate attaching means as claimed in claim 4 wherein limit stop means is provided to position a selected portion of the presser foot in predetermined relation to the indexing means when the presser foot is in its initial position.

6. Nut plate attaching means as claimed in claim 5 wherein the limit stop means comprises a limit stop switch mounted on the head for engagement by a fixed element carried by the presser foot.

7. Nut plate attaching means as claimed in claim 1 wherein the presser foot comprises a stirrup block mounted for slidable movement along such path, a work piece positioning stud is mounted to project from the bottom of the stirrup block to enter such hole in a work piece and the threaded hole in such nut plate, and openings are provided in the presser foot for passage of the drill and the combined rivet holder and squeeze back up member in each rivet setting position.

8. Nut plate attaching means as claimed in claim 1 wherein the indexing means comprises a pair of axially spring biased pins axially parallel to the work axis and spaced apart by a distance equal to the axial separation between the rivet holes in such nut plate, each indexing pin being located to enter, in indexing relation, one of the rivet holes of such nut plate supported on the nut plate support mechanism.

9. Nut plate attaching means as claimed in claim 8 wherein each of the pins is operatively connected to rivet squeezing mechanism of the rivet setting machine.

10. Nut plate attaching means as claimed in claim 1 wherein the actuating means reciprocally moves the presser foot and support mechanism in recurring cycles along such path, and stop means are positioned to arrest the presser foot and support mechanism in each rivet setting position at opposite ends of such path.

11. Nut plate attaching means as claimed in claim 10 wherein the actuating means comprises a double acting air cylinder and each stop means is operatively positioned between an element in fixed relation to the anvil and the nut plate support mechanism, thereby to limit movement of the latter mechanism between such two rivet setting positions.

12. Nut plate attaching means as claimed in claim 11 wherein the stop means for limiting movement of the nut plate support mechanism to an initial rivet setting position comprises a first screw screwed into a threaded hole in an element in fixed relation to the anvil with the head of the first screw axially directed toward the nut plate support mechanism, and a second screw screwed into a threaded hole in an element in fixed relation to the nut plate support mechanism with the head of the second screw axially directed toward the head of the second screw for abutting, arresting contact therewith upon completion of a predetermined travel of the nut plate support mechanism in a selected direction along such path.

13. Nut plate attaching means as claimed in claim 12 wherein two such screws are similarly mounted for abutting, arresting contact with each other upon completion of a predetermined travel of the nut plate support mechanism in each direction along such path, at least one of the screws being axially adjustable to vary the length of travel of the nut plate support mechanism toward said one screw.

14. Nut plate attaching means as claimed in claim 10 wherein a first pin of a size to fit into one of the rivet holes in such nut plate is mounted with its axis in fixed relation to the anvil, and a second pin of a size to enter the other rivet hole in such nut plate is mounted with its axis in fixed relation to the nut plate support mechanism, one of the pins being axially spring pressed to a position spaced endwise from the other pin, said pins being coaxial with the nut plate support mechanism in a selected one limit of its movement, the spring pressed pin being movable axially thereof to a position laterally opposite the other of said pins with the nut plate support mechanism in its opposite limit of movement for adjusting the length of movement of the nut plate support mechanism between its two limits of movement to a position wherein the rivet holes in such nut plate will receive the pins with the nut plate support mechanism in such opposite limit of movement.

15. Nut plate fastening mechanism comprising, in combination with a rivet setting machine having an anvil with a thrust rod mounted therein, a head, and a drill and combined rivet holder and back-up member moving alternately in successive cycles into and out of coincidence with a working axis for drilling a hole and inserting and squeezing a rivet therein, a presser foot mounted on the head for reciprocating movement transversely of the working axis, support mechanism for supporting a work piece having a hole therein and a nut plate having a threaded screw receiving hole and two axially parallel rivet holes therein, said support mechanism comprising affixed base, an inner, inverted, U shape member mounted on the base for reciprocating movement parallel to that of the presser foot, an upward extension on the inner inverted U shape member, two nut plate indexing and rivet squeezing spring pressed pins mounted in axially parallel relation in said upward extension, and spaced apart by the same distance as the rivet holes in such nut plate, the axes of said pins defining a plane containing the working axis and parallel to the reciprocating movement of the presser foot and inner U shape member, a roller support member mounted on the thrust pin and fitted within the inner inverted U shape member, at least one roller mounted on the roller support member and free of operative engagement with the inner inverted U shape member, an outer inverted U shape member fitted over the inverted U shape member for slidable movement parallel to the working axis and supported on said at least one roller for rolling movement parallel to the reciprocating movement of the inner inverted U shape member, means retaining the inner and outer U shape members against relative movement with respect to each other in the direction of reciprocating movement of the inner inverted U shape member, a nut plate support member mounted on the outer U shape member for supporting such nut plate with the rivet receiving holes therein fitted in indexed position onto the indexing and rivet squeezing pins, and clamped to such work piece between the presser foot and the nut plate support with the threaded hole in the nut plate in register with a hole in the work piece, and means for selectively moving the nut plate and work piece so clamped between a first position with the axis of one of said indexing pins coincident with the working axis during a drilling and rivet inserting and squeezing cycle of operation of the rivet setting machine to initially attach such nut plate to such work piece, and a second position with the axis of the other of said indexing pins coincident with the working axis during a drilling and rivet inserting and squeezing cycle of operation of the riveting machine to complete such attachment.

* * * * *